(12) United States Patent
Haddrell

(10) Patent No.: US 7,043,258 B2
(45) Date of Patent: May 9, 2006

(54) MOBILE POSITION FIXING

(75) Inventor: Anthony Haddrell, Rugby (GB)

(73) Assignee: Ceva Ireland Limited, Dublin (IE)

( * ) Notice: Subject to any disclaimer, the term of this patent is extended or adjusted under 35 U.S.C. 154(b) by 373 days.

(21) Appl. No.: 10/360,916

(22) Filed: Feb. 10, 2003

(65) Prior Publication Data

US 2004/0209625 A1   Oct. 21, 2004

(30) Foreign Application Priority Data

Oct. 8, 2002   (GB)   ................................. 0223351

(51) Int. Cl.
*H04M 1/00* (2006.01)
(52) U.S. Cl. ................................ 455/456.6; 455/456.1; 455/574; 455/13.2; 455/502; 342/357.09; 342/357.08; 342/357.01
(58) Field of Classification Search ............. 455/456.1, 455/456.3, 456.5, 456.6, 574, 550.1, 502, 455/13.2; 342/357.01, 357.06, 357.07, 357.08, 342/357.09
See application file for complete search history.

(56) References Cited

U.S. PATENT DOCUMENTS 5,945,944 A      8/1999  Krasner
6,298,229 B1 *  10/2001  Tomlinson et al. ....... 455/404.2
6,584,331 B1 *   6/2003  Ranta ......................... 455/574
2004/0203865 A1 * 10/2004  Krasner ................... 455/456.1

* cited by examiner

*Primary Examiner*—Sonny Trinh
*Assistant Examiner*—Dung Lam

(74) *Attorney, Agent, or Firm*—Oliff & Berridge, PLC

(57) ABSTRACT

A mobile telephony handset has a wireless communications transceiver for exchanging signals with a base station, and a positioning receiver for receiving coded ranging signals from a satellite-based positioning system. The handset is configured such that the positioning receiver is activated only periodically to perform a position fix using the ranging signals and between such active periods is in a power-saving condition. Each position fix includes a respective time measurement in which a precision time indication referenced to the positioning system reference time source is recorded and saved. The handset includes calibration means, which generates a calibrated time reference for performing each of a plurality of new such position fixes. This calibrated reference is derived by summing (a) an elapsed time indication derived from a repeated signal pattern which is received from the base station and is synchronised to the base station reference time source, the elapsed time indication being indicative of the time elapsed since a previous position fix, and (b) the precision time indication obtained with that previous position fix.

19 Claims, 4 Drawing Sheets

MOBILE POSITION FIXING

FIELD OF THE INVENTION

This invention relates to mobile position fixing apparatus and to a method of performing position fixes, primarily with reference to position-fixing in a battery-powered handset such as a cellular telephone handset.

BACKGROUND OF THE INVENTION

It is known to incorporate a GPS (global positioning system) positioning receiver in a mobile telephony handset. One application for such a handset is to allow wireless transmission of handset location information to emergency services, but other applications are envisaged to provide so-called location-based services such as displaying location to the handset user and providing directions to identified destinations. Such functions require rapid satellite signal acquisition and position calculation, leading to receiver complexity and power consumption levels not readily acceptable for a mobile telephony handset.

Satellite-based universal ranging systems which have been proposed or currently exist (such as GPS) transmit ranging signals which are code-modulated in order to spread the signal bandwidth. The receiver for these signals operates to align a replica of the coding sequence with a respective signal received at the antenna in order to achieve correlation and, therefore, to be able to track the signal and to analyse or demodulate the signal. For the civilian (c/a code) GPS signals, a pseudo-random code with a repetition rate of 1 millisecond is used, the code being constituted by 1023 chips (or bits). The same code is repeated at the end of each code sequence. A receiver with no knowledge of time, or of time accurate to better than 1 millisecond, must search all possible code offsets compared to its internally generated code replica until it detects the incoming signal by measuring the power or amplitude of the resulting correlation. Since detection by correlation requires the code replica to be within a 1 half-chip phase of the incoming signal, a conventional GPS receiver must search all possible code offsets, i.e. every possible half-chip phase, of which there are 2046, in order to find the signal.

Accordingly, to achieve rapid signal acquisition in varying signal reception conditions, it is generally necessary to include a bank of 2,046 parallel correlators. Using a correlator bank with fewer correlator channels leads to a lengthy, serial acquisition process which, depending on the limits imposed upon the correlator architecture by handset design constraints, may take several minutes. Performance of this low level is clearly not fit for position-fixing in an emergency situation, nor in some envisaged location-based services.

If the time of arrival of signals at the receiver antenna can be predicted to better than 1 millisecond uncertainty, and if an approximate position is known (e.g. to plus or minus 20 km) together with the positions of the satellites, the time period (or "window") over which the correlators must search for each transmitted signal can be narrowed, with the result that the search can be performed more quickly or can be achieved with fewer parallel correlators, or a combination of both. Some mobile telephony networks have arrangements for delivering precise time via a base station to the mobile unit in order to achieve this. However, in other networks, this is either not possible, or not achievable without significant investment in additional network elements.

A mobile telephony handset for use according to the GSM standard includes a temperature-compensated crystal oscillator (TCXO) which is typically accurate to one part per million and is phased-locked to an oven-controlled crystal oscillator (OCXO) in the base station during a phone call. However, use of the TCXO as a time reference for position fixing is of limited use not only because of the infrequent locking to the base station oscillator, but also because the TCXO is switched off, along with much of the rest of the telephony circuits, at times other than during a call in order to save battery energy. During these quiescent periods, a comparatively low-accuracy low-power oscillator is used as a clock source. Despite the fact that the TCXO may be activated every few seconds to search for an incoming call, the time-keeping is too poor significantly to help the GPS signal acquisition process.

It is an object of the present invention to improve the performance of a position-fixing receiver in a mobile battery-powered handset in terms of processing speed, power consumption, or receiver complexity, or a combination of these parameters.

SUMMARY OF THE INVENTION

Accordingly, in a first aspect, the invention provides a mobile telephony handset comprising a wireless communications transceiver for exchanging signals with a base station which has a base station reference time source, and a positioning receiver for receiving coded ranging signals from a satellite-based positioning system which has a positioning system reference time source, wherein the handset is configured such that the positioning receiver is activated only periodically to perform a position fix using the ranging signals and between such active periods is in a power-saving condition, the position fix including a respective time measurement in which a precision time indication referenced to the positioning system reference time source is recorded and saved, the handset including calibration means arranged, for each of a plurality of new such position fixes, to combine (a) an elapsed time indication derived from periodic sampling of a repeated signal pattern which is received from the base station and is synchronised to the base station reference time source, the elapsed time indication being indicative of the time elapsed since a previous position fix, and (b) the precision time indication obtained with that previous position fix, thereby to generate a calibrated time reference for performing the new position fix.

In this way, the precision time indication derived in a first position fix is used to calibrate timing signals obtained from the repeated signal pattern received by the wireless communications transceiver on the base station, to provide a time datum for a subsequent fix. Such a signal pattern may be a so-called training signal sequence transmitted by the base station every few seconds, the transceiver circuitry being activated by a low-accuracy background clock at the appropriate times to receive this signal pattern.

In practice, the handset may be arranged to activate the positioning receiver much less frequently than the activation cycle of the wireless communications transceiver. Indeed, the activation repetition rate of the positioning receiver may be variable in response to environmental factors, e.g. handset velocity, or the signal strength of the ranging signals. A period between activations in the region of from 30 seconds to 10 minutes is typical.

Except during a call, the signal received by the wireless communications transceiver from the base station may comprise repeated frames which carry identifiers in the form of frame numbers. Arranging for the identifiers to be read can be used to aid determination of the time which elapsed from a first position fix performed by the position-fixing receiver and the next position fix (i.e. when the receiver is next activated).

The handset is also preferably arranged to receive positioning system assistance data such as, in the case of GPS, ephemeris data transmitted from the base station. Acquisition of such data directly from signals received by the position-fixing receiver may be difficult when the received signals are weak or the position-fixing process is performed in a short time.

The handset may also be arranged to receive from the base station an approximate time reference, cell location data and cell size data, and to use such data in the determination of the period between successive activations of the position-fixing receiver and for estimating the code offset range in which to search for signals.

Typically, the precision time indication obtained from a position fix is accurate to within + or −1 microsecond, i.e. several orders of magnitude better than the + or −100 millisecond accuracy available from signals received from the base station.

The elapsed time indication available from the repeated signal pattern received from the base station is obtained by counting the patterns ("frames" above), whether using the identifiers or in another way, and summing the elapsed time and the precision time indication to yield an estimate of time which is more accurate than would be available by monitoring the repeated signal patterns alone. Using this time estimate, it is possible to reduce the code offset range, in time terms, by a factor of at least 10 and, typically, 20 or more. It is, therefore, typically possible to achieve a position fix in less than 10 seconds with a parallel correlator bank containing less than 200 correlators. Indeed, in a preferred embodiment, fewer than 100 correlators may be used to search an offset window of + or −20 microseconds, the acquisition and correlation process taking 1 to 2 seconds.

Clearly, when the handset is first switched on or the positioning function first activated, such a cut-down correlator architecture may need from a minute up to several minutes to perform an initial position fix. Thereafter, use of the invention allows rapid position fixing as described above.

A further refinement aiding rapid position-fixing is providing means in the position-fixing receiver for storing the identity of the transmitter providing ranging signals with the best signal strength in a given position fix, and then causing the correlators to search for the signals from that same transmitter before the signals transmitted by other transmitters, data obtained in the first signal acquisition being used to aid acquisition of the other transmitted signals needed for the fix.

According to a second aspect of the invention, there is provided a method of performing position fixes in a mobile handset which contains a wireless communications transceiver exchanging signals with a base station having a base station reference time source, and a positioning receiver receiving coded ranging signals from a satellite-based positioning system having a positioning system reference time source, wherein the method comprises activating the positioning receiver only periodically to perform a position fix using the ranging signals and, between such active periods, putting the receiver in a power-saving condition, wherein the position fix includes a respective time measurement in which a precision time indication referenced to the positioning system reference time source is recorded and saved, and wherein, in the performance of each of a plurality of such position fixes, a calibrated time reference for the fix is generated by deriving an elapsed time indication from a repeated signal pattern which is received from the base station and is synchronised to the base station reference time source, the elapsed time indication being indicative of the time elapsed since a previous position fix, and combining the elapsed time indication with a precision time indication obtained with the previous position fix.

According to a third aspect of the invention there is provided a method of performing positioning fixes in a mobile GPS receiver contained in a mobile unit which also contains a wireless communications transceiver which communicates with a remote wireless communications base station, the base station transmitting a signal having a regular pattern synchronized to a base station time reference, wherein the GPS receiver is operated in a power-saving mode in which it is activated only periodically to allow a position fix to be performed, and wherein the method comprises recording a GPS time reading obtained as part of a first position fix and then, as part of a subsequent position fix, determining the time which has elapsed since the first position fix on the basis of a repeated signal received by the communications transceiver from the base station.

The invention is not limited to use with the GPS system. Indeed, it may be used in a system in which some of the transmitters are terrestrial. Nor is the invention limited to use in a handset for voice communication. Other wireless communication networks transmitting time-referenced repeated signals may be used, these signals being calibrated by sampling the precision time reference provided by the ranging system. The invention is, however, of particular application in a handheld battery-powered unit where circuitry for receiving signals both from the positioning system transmitters and a wireless communications source are activated only periodically to conserve battery power.

The invention will now be described below by way of example with reference to the drawings.

DETAILED DESCRIPTION OF THE PREFERRED EMBODIMENT

Figure 1:
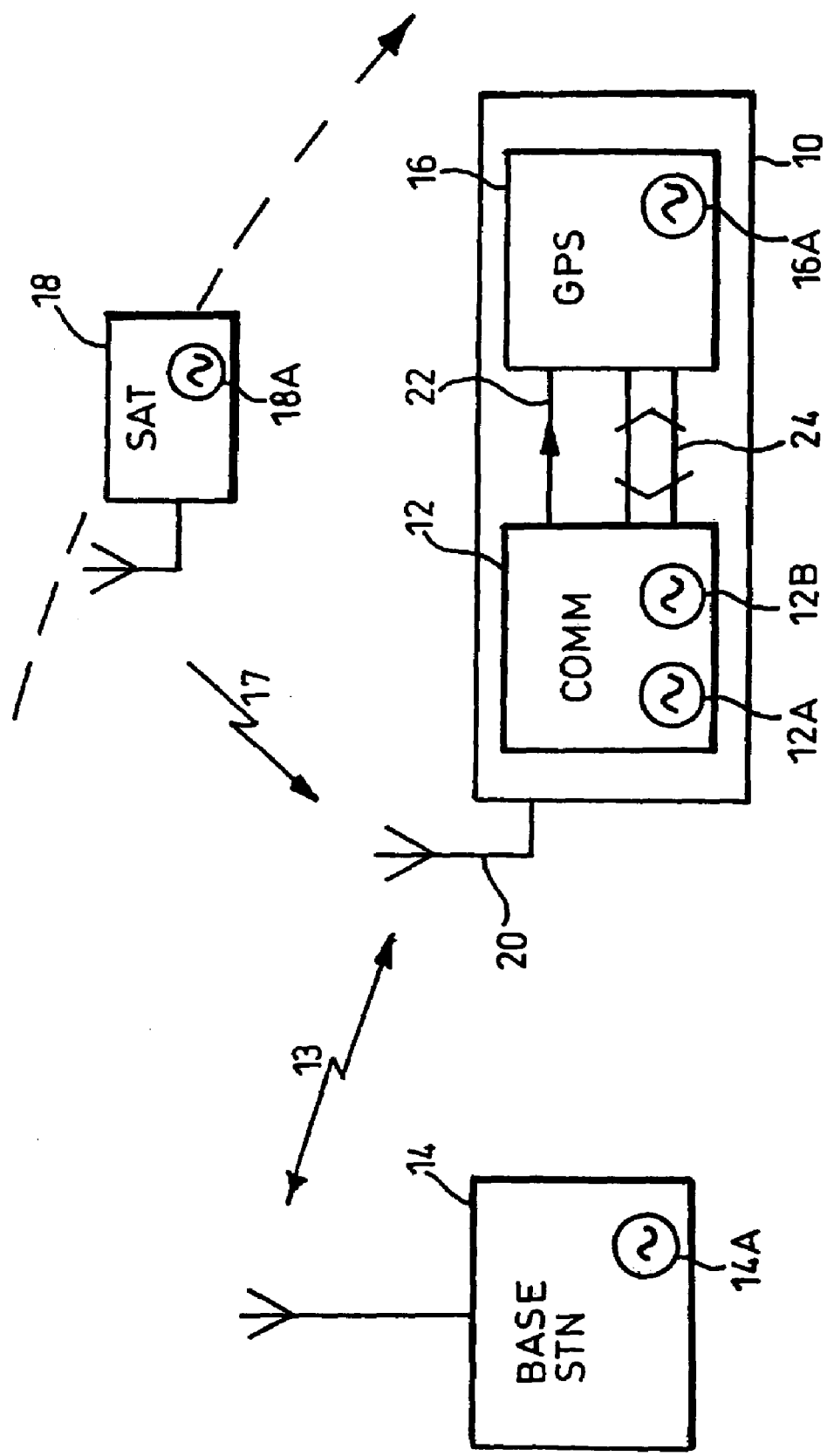
FIG. 1 is a block diagram showing a general arrangement of a mobile telephony handset in accordance with the invention and a base station forming part of a cellular telephony system and one satellite forming part of a satellite universal ranging system.

Referring to FIG. 1, a battery-powered handset 10 in accordance with the invention contains a wireless communications transceiver 12 for exchanging voice and data signals 13 with a base station 14 forming part of a cellular telephony system. The description which follows relates to a cellular system based on the GSM standard, but it is to be understood that the invention is applicable to other wireless communication systems. Included within the handset 10 is a position-fixing receiver, in this case a GPS receiver 16 arranged to receive ranging signals 17 from a constellation of transmitting satellites, one of which, 18, is shown in FIG. 1. In this case, a common antenna 20 is used both by the communications transceiver 12 and the GPS receiver 16.

The speed with which the GPS receiver 16 can perform a position fixing process depends, amongst other things, on the accuracy of the time reference used in the correlation process, as is well known in the GPS receiver art. As an aid to understanding the purpose and operation of the means by which a precision time reference is provided in the handset 10 for position-fixing purposes, a number of referenced time sources are described with reference to FIG. 1. Each satellite transmitter 18 has a precision reference time source 18A ("GPS time") which is accurate to 10 nanoseconds or better. The cell base station 14 has an oven-controlled crystal oscillator with frequency accurate to 1 part in $10^8$. This is the timing reference used by the cellular telephony system for controlling the multiplexing of multiple signals to and from a number of handsets which may be communicating with the base station at any given time. Communications transceiver 12 has two time sources. A temperature-compensated crystal oscillator 12A which, unless the handset is handling a call, is activated for a fraction of a second only every few seconds (typically every two to six seconds). This oscillator has a basic frequency accuracy of 1 part in $10^6$ and is usually only phase-locked to the base station time reference source 14A during a call. At other times, the only time-keeping source in the transceiver 12 is a low-accuracy low-power crystal oscillator 12B, usually uncompensated, and having a frequency accuracy in the region of 1 part in $10^4$. Given that, in order to conserve battery power, the oscillators 12A and 16A must be deactivated for the majority of the time and since synchronisation with the base station source 14A is intermittent, position-fixing using the GPS receiver 16 needs the assistance of special measures if excessive complexity, power consumption and processing time are to be avoided.

It will be understood that the communications transceiver 12 and GPS receiver 16 can share a number of resources within the handset, including time and frequency sources, processing capability, and power supply circuitry. Particular connections shown in FIG. 1 are a signal path 22 for conveying a timing pulse from transceiver 12 to the GPS receiver 16, and a data link 24 for conveying, amongst other data, base station signal pattern identifiers, here frame numbers, as part of the time calibrating process, as will be described below.

Figure 2:
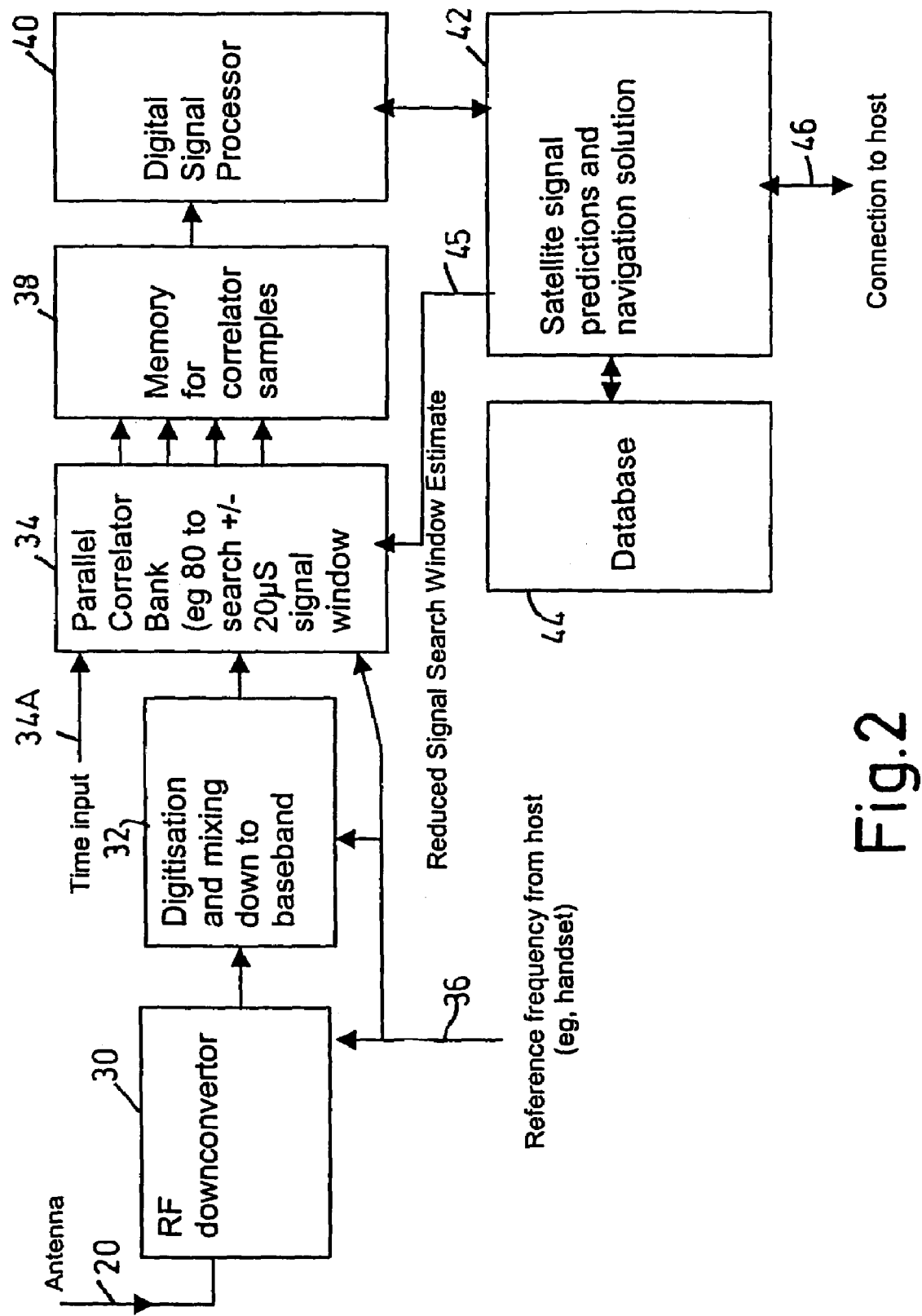
FIG. 2 is a simplified block diagram of a position-fixing receiver forming part of the arrangement shown in FIG. 1.

Before describing the operation of the handset 10, it is useful to consider the configuration of the GPS receiver 16. Referring, therefore to FIG. 2, receiver 16 has a front-end radio frequency (RF) stage 30 including an RF downconverter, which feeds a digitising stage 32 where down-converted ranging signals are digitised in an analogue-to-digital converter and mixed down to baseband prior to being fed to a correlator bank 34. In this embodiment the correlator bank 34 has 80 parallel correlator channels. These are capable of searching a 20 microsecond signal window in less than 5 seconds. It will be understood that the cost, size, and power consumption of such a correlator bank is very much less than one capable of searching the whole GPS code in a similar time period.

All three stages 30, 32 and 34 receive synthesised reference frequencies from a synthesiser locked to a common oscillator which, in this case, is the handset TCXO 12A (FIG. 1). The integrated outputs from the correlator bank 34 are stored in a memory 38 as correlation samples for processing by a digital signal processor 40 coupled to the memory 38. A second processor 42 coupled to a database memory 44 controls the search and correlation process carried out by correlator bank 34. This second processor 42 also controls (via link 45) the processing of the correlation samples by digital signal processor 40 according to information derived from signals received from the base station 14 (FIG. 1) and information based on calculations performed on data relating to the signals received in previous position fixes in order to vary the time between successive position fixes and the manner of searching, as well as, for instance, the magnitude of the search window. Processor 42 also performs the navigation solution based on pseudoranges obtained from the digital signal processor 40. Overall control of the GPS receiver in general and the processor 42 in particular is achieved via a connection 46 to a host processor in the handset or all of processors 40 and 42, and the host processor, may be combined as a single processor.

A calibrated time reference is provided to the correlator bank 34 on a time input 34A for setting the timing of the search window. This time reference is calibrated in the sense that it is an estimate of time based on the sum of a precision time indication obtained in a previous position fix and the time elapsed since the previous fix as measured by timing pulses from the communications transceiver 12.

Figure 3:
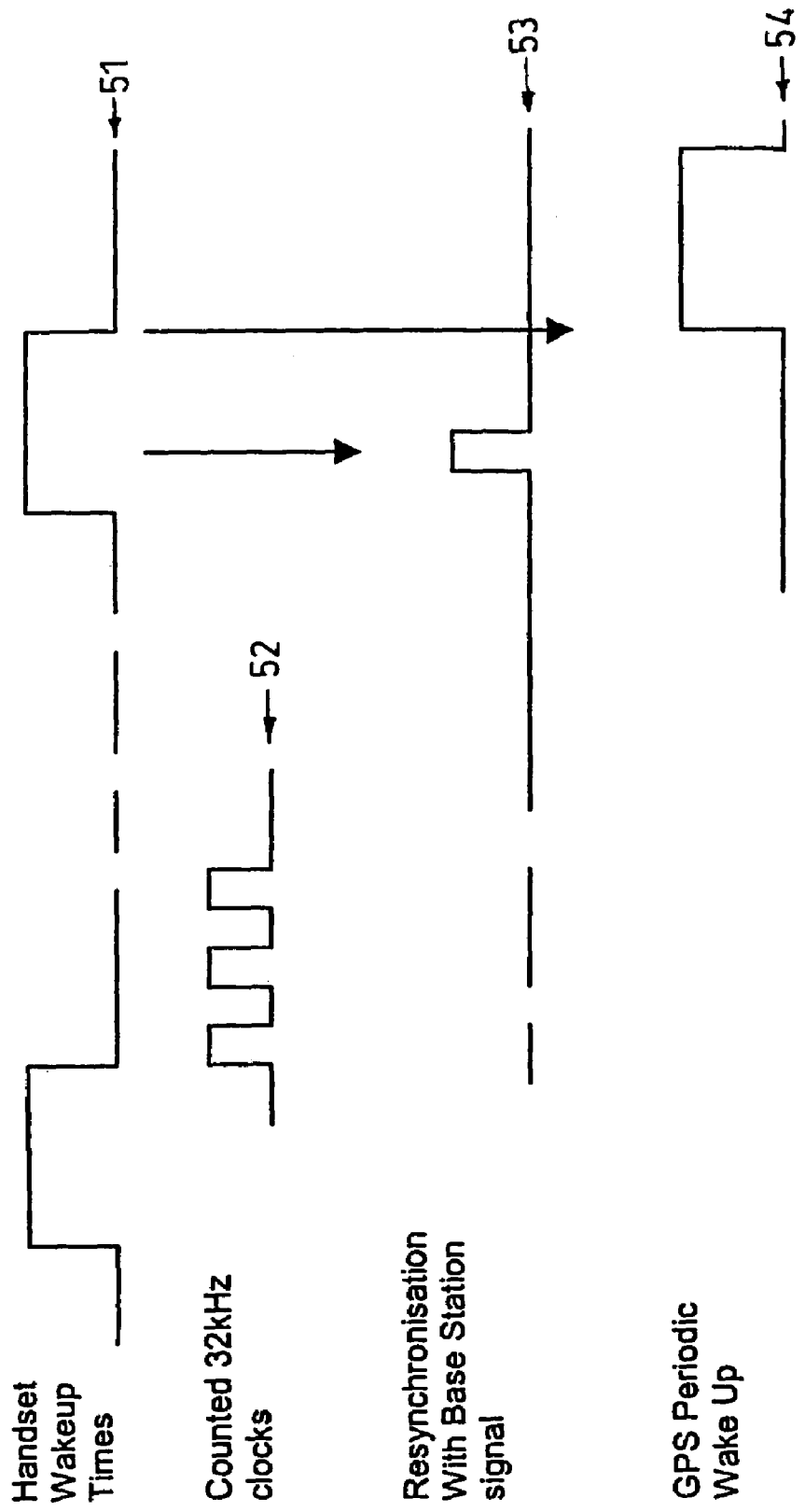
FIG. 3 is a timing diagram illustrating activation periods of a wireless communications transceiver and the position-fixing receiver.

Referring to FIG. 3, as mentioned above, the main parts of the communications transceiver 12 are switched off for the majority of time between calls. This circuitry is powered only during short wake-up times lasting each a fraction of a second, and repeated at intervals of, typically, about 4 seconds, as shown by line 51 in FIG. 3. During these activated periods, the communications transceiver 12 accesses only the relevant part of the paging channel allocated to it by the serving cell (the base station 14) to check for an incoming call. At other times, time-keeping is performed by counting pulses of the background low-power clock 12B, see line 52. To avoid integrating the poor time-keeping of the background clock 12B, which could potentially lose a data bit length after a few activation periods of the transceiver 12 (as shown in line 51), the background clock 12B is re-synchronised to each frame of data received from the base station whenever the transceiver 12 is active. During the active periods, received frames are decoded and, if required, the identifiers (frame numbers) are stored. Accordingly, the drift experienced by the background clock 12B is limited to the combined drift of the base station time reference source 14A and the background clock itself over the interval between active periods of the transceiver 12, see line 53 of FIG. 3. The periods between activations of the GPS receiver 16, represented by the pulse in line 54, are variable but are timed so as to allow synchronisation with a frame received from the base station during one of the active periods of the transceiver 12 and such that an elapsed time indication can be provided as an exact number of frames since the last active period of the GPS receiver. For every activation of the GPS receiver 16, the transceiver 12 is typically activated between 8 and 150 times. The number of network frames is counted during the inactive periods of the GPS receiver and used in a manner which will be described below.

Figure 4:
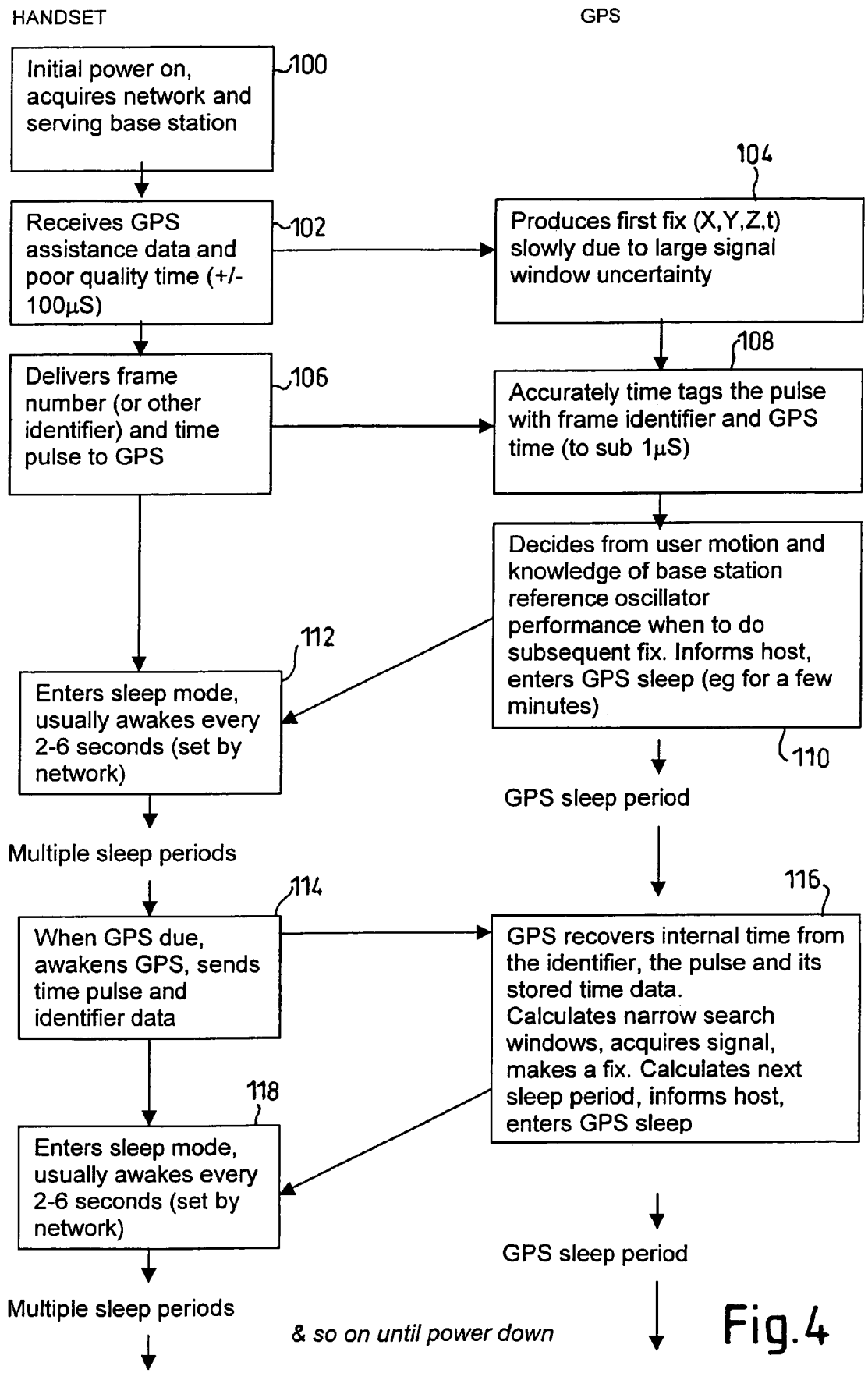
FIG. 4 is a flowchart showing the sequence of operations performed by the handset.

Operation of the handset 10 will now be described in more detail with reference to FIG. 4. The flowchart of FIG. 4 contains operations in two columns, the left-hand column representing operations of the transceiver 12 and the right-hand column representing operations of the GPS receiver 16 (FIG. 1).

The flowchart commences with the initial application of power to the handset. In the conventional manner, the transceiver 12 acquires the cellular network via the base station 14 (step 100). Assuming the position-fixing function of the handset is selected, GPS assistance data is received in step 102, together with a poor quality time indication accurate to + or −100 milliseconds.

This network time is insufficiently accurate as a reference for performing a narrow time-window search by the GPS receiver 16. The assistance data received from the base station is GPS ephemeris data obtained from a GPS receiver which is contained within the network of which the base station 14 forms part. This allows position fixing by the GPS receiver 16 without itself having to receive the ranging signals over a sufficient period or with sufficient signal strength to demodulate the same data available from the ranging signals it receives.

The host processor (not shown in the figures) now causes the GPS receiver 16 to perform an initial position fix. Since time is not known accurately, the position-fixing process may take a minute or more, depending on the available signal strength from the satellite constellation. The fix produces X, Y and Z co-ordinates for the handset location and determines time to an accuracy of better than 1 microsecond and typically better than 10 nanoseconds. The frequency of the handset oscillator is also accurately determined. It will be understood that this initial fix has to be performed over a significant time owing to the need to search all 2046 half-chips of the GPS code (step 104).

At a time associated with the instant corresponding to the precision time indication t obtained from the initial fix, the transceiver 12 receives and identifies one of the frames transmitted by the base station 14 and, as represented by step 106, generates a precisely timed pulse referenced to the received frame. The pulse is delivered to the GPS receiver which stores the identifier (frame number) and attaches a "time tag" indicative of the time of a predetermined part of the frame referenced to the precision time indication produced in the initial fix (step 108). At this stage, as a result of the accuracy with which the position fix produces a time reference linked to the reference source 18A (FIG. 1) from the transmitting satellite 18, the received frame is calibrated to an accuracy of less than + or −1 microsecond. Consequent upon this exchange of timing information between the transceiver 12 and the GPS receiver 16, i.e. the combination of the timing of the frame and the precision time indication as a result of the precision fix, it is possible to maintain a comparatively accurate timing reference for a subsequent position fix.

The accuracy with which that timing reference can be maintained and used as time elapses after the fix from which the precision time indication was obtained is dependent upon a number of factors. The most significant of these is the accuracy of the base station time reference 14A which controls the timing of the frames received by the transceiver 12. Another factor is the movement of the user since the last position fix was performed. Amongst the data received from the base station is the location of the base station itself or that of the cell boundaries. In this case, the GPS receiver stores in its database the maximum radius of the respective cell so that the degree of uncertainty of its position relative to the satellites can be predicted. Accordingly, following the time-tagging step 108, the handset processors, in this case the processor of the GPS receiver, calculate from the parameters of the received ranging signals the motion of the handset (using a Doppler shift calculation). The processors, may, in addition, assess the signal strength of the ranging signals from respective satellites. This will allow, for instance, determination of the handset environment, such as whether the handset is indoors (and therefore unlikely to be moving significantly) or moving rapidly, and so on. The processor is programmed to calculate, from this information, when the next position fix should be performed. It follows that if the user is not moving and the signal strength tends to indicate location indoors, the time between fixes can be quite long (typically several minutes). On the other hand, if the user is moving rapidly, fixes can be carried out, say, once or twice a minute. In step 110, having computed the timing of the next receiver activation, the host processor is informed and the GPS receiver is deactivated by the host. At or around the same time, the handset 12 reverts to periodic activation, as indicated by step 112.

Whilst the GPS receiver is in this power-saving condition, the transceiver 12 continues its periodic activation and deactivation sequence as illustrated in line 51 of FIG. 3 until the time of the next GPS receiver activation arrives. At this point, the host processor powers the GPS receiver 16 on, reads the frame identifier, generates another associated timing pulse (as in step 106) and sends the timing pulse and the frame identifier data to the processor providing the GPS receiver 16 with its calibrated time reference (step 114). This processor computes the number of frames generated by the base station since the time of the last fix. (This may be done by subtracting the respective frame numbers from each other and multiplying by the frame period or, if the background clock (12B in FIG. 1) is sufficiently accurate, it may be possible to track the frames from handset activation to handset activation thereby to obtain the number of frames from one fix to the next without use of the identifiers.) By combining (in step 116) this elapsed time indication based on the frames count on the one hand, with the precision time indication obtained from the position fix performed in step 104 on the other hand, an accurate estimate of the actual time can be calculated and, as a result, a much narrower correlation search window can be calculated than the search window used for the initial fix. The accuracy of the so-called "accurate estimate" may also be predicted from one or more position fixes, including environmental conditions, to determine the width of the correlation search window. Accordingly, the ranging signals are rapidly acquired and a fix made. Again, environmental conditions may be assessed to calculate the next deactivation interval and, as before, the host processor is informed and the receiver is once again deactivated (step 116). Again, as before, the transceiver 12 reverts to its regular activation and deactivation sequence (step 118).

Periodic activation and deactivation of the GPS receiver 16 continues in this way until the GPS function is disabled or the handset is turned off.

It will be understood that the precise architecture and operation of the GPS receiver described above is purely exemplary. Other architectures and other arrangements of handset modules and their interaction are possible, depending on the application of the invention (e.g. whether for emergency location or other types of location-based services).

What is claimed is:

1. A mobile telephony handset comprising a wireless communications transceiver for exchanging signals with a base station which has a base station reference time source, and a positioning receiver for receiving coded ranging signals from a satellite-based positioning system which has a positioning system reference time source, wherein the handset is configured such that the positioning receiver is activated only periodically to perform a position fix using the ranging signals and between such active periods is in a power-saving condition, the position fix including a respective time measurement in which a precision time indication referenced to the positioning system reference time source is recorded and saved, the handset including calibration means arranged, for each of a plurality of new such position fixes, to combine (a) an elapsed time indication derived from a repeated signal pattern which is received from the base station and is synchronised to the base station reference time source, the elapsed time indication being indicative of the time elapsed since a previous position fix, and (b) the precision time indication obtained with that previous position fix, thereby to generate a calibrated time reference for performing the new position fix.

2. A handset as claimed in claim 1, arranged such that the wireless communications transceiver is periodically activated to receive said signal pattern, and such that the positioning receiver is activated less frequently than said activation of the transceiver.

3. A handset as claimed in claim 2, arranged such that the activation repetition rate of the positioning receiver is variable in response to environmental factors.

4. A handset as claimed in claim 2, arranged such that the periods between activations of the positioning receiver are in the range of from 30 seconds to 10 minutes.

5. A handset as claimed in claim 1, arranged such that the wireless communications transceiver is adapted to receive from the base station a repeated signal comprising repeated frames which carry identifiers, to read said identifiers, and to use said reading of identifiers to aid the determination of the elapsed time between consecutive position fixes performed by the positioning receiver.

6. A handset as claimed in claim 5, arranged to receive the frame identifiers as frame numbers.

7. A handset as claimed in claim 1, arranged to receive from the base station at least one of an approximate time reference, cell location data and cell size data to determine the periods between successive activations of the positioning receiver and to estimate a code offset range in which to search for said ranging signals.

8. A method of performing position fixes in a mobile handset which contains a wireless communications transceiver exchanging signals with a base station having a base station reference time source, and a positioning receiver receiving coded ranging signals from a satellite-based positioning system having a positioning system reference time source, wherein the method comprises activating the positioning receiver only periodically to perform a position fix using the ranging signals and, between such active periods, putting the receiver in a power-saving condition, wherein the position fix includes a respective time measurement in which a precision time indication referenced to the positioning system reference time source is recorded and saved, and wherein, in the performance of each of a plurality of such position fixes, a calibrated time reference for the fix is generated by deriving an elapsed time indication from a repeated signal pattern which is received from the base station and is synchronised to the base station reference time source, the elapsed time indication being indicative of the time elapsed since a previous position fix, and combining the elapsed time indication with a precision time indication obtained with the previous position fix.

9. A method as claimed in claim 8, wherein the wireless communications transceiver is periodically activated to receive said signal pattern, and wherein the positioning receiver is activated less frequently than said activation of the transceiver.

10. A method as claimed in claim 9, wherein the activation repetition rate of the positioning receiver is variable in response to environmental factors.

11. A method as claimed in claim 9, wherein the periods between activations of the positioning receiver are in the range of from 30 seconds to 10 minutes.

12. A method as claimed in claim 8, wherein said transceiver receives from the base station a repeated signal comprising repeated frames which carry identifiers, the method further comprising reading said identifiers and, in response to said reading, determining the elapsed time between position fixes performed by the positioning receiver.

13. A method as claimed in claim 12, wherein the identifiers are frame numbers.

14. A method according to claim 8, including receiving from the base station at least one of an approximate time reference, cell location data and cell size data to determine the periods between successive activations of the positioning receiver and estimating a code offset range in which to search for said ranging signals.

15. A method as claimed in claim 8, wherein the combining step involves summing the precision time indication and the elapsed time indication.

16. A method as claimed in claim 8, wherein the positioning receiver stores the identity of a transmitter providing ranging signals with the best signal strength in a given position fix, correlators of the receiver then searching for the signals from said transmitter before the signals transmitted by other transmitters, data obtained in the first signal acquisition being used to aid acquisition of the other transmitted signals needed for the position fix.

17. A method of performing positioning fixes in a mobile GPS receiver contained in a mobile unit which also contains a wireless communications transceiver which communicates with a remote wireless communications base station, the base station transmitting a signal having a regular pattern synchronised to a base station time reference, wherein the GPS receiver is operated in a power-saving mode in which it is activated only periodically to allow a position fix to be performed, and wherein the method comprises recording a GPS time reading obtained as part of a first position fix and then, as part of a subsequent position fix, determining the time which has elapsed since the first position fix on the basis of a repeated signal received by the communications transceiver from the base station.

18. A method as claimed in claim 17, wherein the wireless communications transceiver receives positioning system assistance data from the base station.

19. A method as claimed in claim 18, wherein the assistance data is GPS ephemeris data.

* * * * *